(12) United States Patent
Bao et al.

(10) Patent No.: US 9,342,491 B2
(45) Date of Patent: *May 17, 2016

(54) ENRICHING WEBSITE CONTENT WITH EXTRACTED FEATURE MULTI-DIMENSIONAL VECTOR COMPARISON

(71) Applicant: International Business Machines Corporation, Armonk, NY (US)

(72) Inventors: Sheng Hua Bao, Beijing (CN); Ke Ke Cai, Beijing (CN); Hong Lei Guo, Beijing (CN); Zhong Su, Beijing (CN); Xian Wu, Beijing (CN); Li Zhang, Beijing (CN); Shuo Zhang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 265 days.

This patent is subject to a terminal disclaimer.

(21) Appl. No.: 13/967,871

(22) Filed: Aug. 15, 2013

(65) Prior Publication Data

US 2014/0040727 A1 Feb. 6, 2014

Related U.S. Application Data

(63) Continuation of application No. 13/947,197, filed on Jul. 22, 2013.

(30) Foreign Application Priority Data

Jul. 31, 2012 (CN) .......................... 2012 1 0270201

(51) Int. Cl.
*G06F 17/00* (2006.01)
*G06F 17/22* (2006.01)
(Continued)

(52) U.S. Cl.
CPC ............ *G06F 17/2247* (2013.01); *G06F 17/00* (2013.01); *G06F 17/2785* (2013.01);
(Continued)

(58) Field of Classification Search
CPC .................... G06F 17/30117; G06F 17/30598; G06Q 30/00; G06Q 30/0277; G06Q 30/0643
See application file for complete search history.

(56) References Cited

U.S. PATENT DOCUMENTS 7,133,862 B2* 11/2006 Hubert et al.
8,005,862 B2* 8/2011 Zwol et al. .................... 707/791
(Continued)

OTHER PUBLICATIONS

Maayan Geffett and Ido Dagan, "Feature Vector Quality and Distributional Similarity", 1-5 are pertinent.*

(Continued)

*Primary Examiner* — Cesar Paula
*Assistant Examiner* — Benjamin Norris
(74) *Attorney, Agent, or Firm* — Cantor Colburn LLP

(57) ABSTRACT

A method for enriching contents of a website includes obtaining a corpus from the current website and other websites, and extracting object features from the corpus, wherein the corpus comprises specifications of the object and user reviews about the object; according to the corpus, constructing multi-dimensional vectors for the extracted features; for a specified feature, making similarity comparison of its multi-dimensional vector and multi-dimensional vectors of other extracted features; determining features with similarities higher than a predetermined threshold as the same features, and reinforcing the current website with features different from that of the object on the current website and their corresponding attributes.

20 Claims, 6 Drawing Sheets

(51) Int. Cl.
*G06Q 30/02* (2012.01)
*G06Q 30/06* (2012.01)
*G06Q 30/00* (2012.01)
*G06F 17/27* (2006.01)

(52) U.S. Cl.
CPC ............ *G06Q30/00* (2013.01); *G06Q 30/0277* (2013.01); *G06Q 30/0641* (2013.01); *G06Q 30/0643* (2013.01)

(56) References Cited

U.S. PATENT DOCUMENTS

| | | |
|---|---|---|
| 8,086,496 B2 | 12/2011 | Lu et al. |
| 8,161,030 B2 | 4/2012 | Ruhl et al. |
| 2008/0040339 A1* | 2/2008 | Zhou et al. ................ 707/5 |
| 2008/0294643 A1* | 11/2008 | Moss et al. ............... 707/10 |
| 2011/0320442 A1* | 12/2011 | Faruquie et al. .............. 707/723 |
| 2013/0041652 A1* | 2/2013 | Zuev et al. .................... 704/8 |
| 2014/0040723 A1* | 2/2014 | Bao ................ G06F 17/2247 715/234 |

OTHER PUBLICATIONS

Wikipedia, "Vector Space Model", visisted Sep. 19, 2011, pp. 1-2 are pertinent.*
Wikipedia, [online]; [retrieved on Jul. 9, 2013]; retrieved from the Internet http://en.wikipedia.org/wiki/Part-of-speech_tagging Wikipedia, "Part-of-Speech Tagging," Wikimedia Foundation, Inc., pp. 1-7, 2013.
Ana-Maria Popescu and Oren Etzioni, "Opinion Mining: Extracting Product Feature Assessments from Reviews," in Proceedings of Human language Technology Conference and Conference on Empirical methods in Natural Language Processing, 2005, pp. 339-346.

* cited by examiner

| Key Features | |
|---|---|
| Storage Capacity | 32 GB |
| Color | Black |
| Network Generation | 3G |
| Network Technology | GSM / EDGE / UMTS / HSDPA / HSUPA |
| Band | GSM/EDGE 850/900/1800/1900 UMTS/HSDPA/HSUPA 850/900/1900/2100 |
| Camera | 5.0 MP |
| Operating System | iOS |

| Battery | |
|---|---|
| Battery Type | Lithium Ion |
| Battery Capacity | 1420 mAh |
| Battery Talk Time | Up to 840 min |
| Battery Standby Time | Up to 300 hr |

| Display | |
|---|---|
| Display Technology | TFT LCD |
| Diagonal Screen Size | 3.5 in. |
| Display Resolution | 960 x 640 pixels |

| Other Features | |
|---|---|
| Touch Screen | Yes |
| Bluetooth | Yes |
| Digital Camera | Yes |
| GPS | Yes |
| QWERTY Physical Keyboard | No |
| Email Access | Yes |
| Internet Browser | Yes |
| Speakerphone | Yes |

| Dimensions | |
|---|---|
| Height | 4.5 in. |
| Depth | 0.37 in. |
| Width | 2.31 in. |
| Weight | 4.8 oz |

| Miscellaneous | |
|---|---|
| Release Date | 6/15/2010 |

FIG. 4

| Original | | Supplemented | |
|---|---|---|---|
| Basic Parameters | | Dimensions | 117.3 × 58.8 × 10.5 mm |
| Brand | Noka | Weight | 130 g |
| Price Range | 1801-2000 YUAN | Network Band | WCDMA 850/900/1700/1900/2100 GSM 850/900 |
| Time to Market | 2010 | Color | sixteen million |
| Network Technology | CU 3G GSM/WCDMA | Screen Technology | AMOLED |
| Appearance | Bar Phone | Gravity Sensor | Yes |
| | | Secondary Camera | 0.3MP |
| Main Screen Size | 3.5 inches | Sensor Type | CMOS |
| Camera | 8 MP | Flash | LED |
| Smart Phone | Yes | Video Record | 720p (1280×720, 25 F/s) Video Recording |
| Operating System | Symbian | Continuous Shooting | 720p (1280×720, 25 F/s) Video Recording<br>720p (1280×720, 30 F/s) Video Playing<br>Video Call Camera 480p (640×480) |
| Advanced functions | WIFI GPS | Battery model | BL-5K |
| Touch Screen Type | Capacitive | Battery Type | Lithium |
| | | Battery Capability | 1200mAh |
| CPU | 680M | Ideal Talk Time | 315min (2G), 216min (3G) |
| RAM | 256M | Ideal Standby | 555 h (2G), 656 h (3G) |
| ROM | 8g | Other Times | Music Playing Time: 54 h<br>Video Playing Time: 6.5 h<br>Video Recording Time: 3.8 h<br>Video Call Time: 2.6 h |
| Keyboard | Virtual touch keyboard | | |
| Thickness | Normal largher than 1cm | | |
| Main Display Resolution | 640×360 pixels | | |

ENRICHING WEBSITE CONTENT WITH EXTRACTED FEATURE MULTI-DIMENSIONAL VECTOR COMPARISON

PRIORITY

This application is a continuation of U.S. patent application Ser. No. 13/947,197, filed Jul. 22, 2013, which claims priority to Chinese Application No. 201210270201.4, filed Jul. 31, 2012, and all the benefits accruing therefrom under 35 U.S.C. §119, the contents of which in its entirety are herein incorporated by reference.

BACKGROUND

The present invention generally relates to a method and apparatus for enriching website content, and more specifically, to enriching object specifications in a website through semantic analysis and computing methods.

Currently, various websites provide diverse contents. A webpage general maintains a specification of an object, such as a matter, a product, or a figure. When users browse the webpage, a demand is inclined to arise, i.e., a wish to learn other aspects of the matter, product or figure, particularly, a webpage on which specifications about the matter, product or figure that are found on this website and other websites are aggregated together for the convenience of reading by users.

As an example, a user browses a specification of a figure on a webpage, and wants to learn more aspects about the figure. However, the webpage only contains the age, height, sex of this figure. If the user wants to know other aspects of this figure, he has to refer to other Webpages. Thus, an aggregated webpage is desirable by the user, on which specifications about the figure are aggregated in terms of, for example, age, height, sex, hobby, profession, blood type, constellation and other aspects for the convenience of reading by users.

As an example, a user browses a specification of a product on a webpage, and wants to learn more aspects of the product. However, that webpage only contains the model, color, price of the product. If the user wants to know other aspects of the product, he has to refer to other Webpages. Thus, an aggregated webpage is desirable by the user, on which specifications about the figure are aggregated in terms of model, color, price, size, chip set, memory, weight, height and other aspects for the convenience of reading by users.

Generally, on a webpage having a specification of a figure, there are reviews and feelings given by other users who have view the specification of the figure, also some reviews and feelings from other users who have view the specification of a product, those reviews and feelings about the figure or product are arranged in different blocks of the webpage.

Specifications about the same objects on variant websites usually employ different words and expressions. Repeated information may be provided if specifications and data provided on websites are simply collected. For example, expressions screen, display, phone screen, display screen, etc. may appear on specifications of the same object on different websites separately, which however have substantially the same meaning. Aggregating such information into a webpage may provide repeated information and thus poor webpage readability.

On the other hand, the prior art only pay attention to the collection and extraction of website specifications. Actually, there are a plenty of useful information existed in user reviews and feelings. The prior art cannot achieve the maximum utilization of webpage information.

SUMMARY

In an exemplary embodiment, a method for enriching contents of a website includes obtaining a corpus from the current website and other websites, and extracting object features from the corpus, wherein the corpus comprises specifications of the object and user reviews about the object; according to the corpus, constructing multi-dimensional vectors for the extracted features; for a specific feature, making similarity comparison of its multi-dimensional vectors and multi-dimensional vectors of other extracted features; and determining features with similarities being higher than a predetermined threshold as a same feature, and reinforcing the current web site with at least one feature which is different from those on the website and corresponding attributes of the at least one feature.

In another embodiment, an apparatus for enriching contents of a website includes an extracting unit configured to obtain a corpus from the current website and other websites, and extracting object features from the corpus, wherein the corpus comprises specifications of the object and user reviews about the object; a feature vector constructing unit configured to construct multi-dimensional vectors for the extracted features according to the corpus; a vector comparison unit configured to, for a specific feature, make similarity comparison of its multi-dimensional vector and multi-dimensional vectors of other extracted features; and a reinforcing unit configured to determine features with similarities being higher than a predetermined threshold as a same feature, and reinforcing the current website with at least one feature which is different from those on the website and corresponding attributes of the at least one feature.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 schematically shows a specification of an object on an exemplary website;

FIG. 6 shows a schematic diagram of a webpage after content supplementation according to an embodiment of this invention.

DETAILED DESCRIPTION

Figure 1:
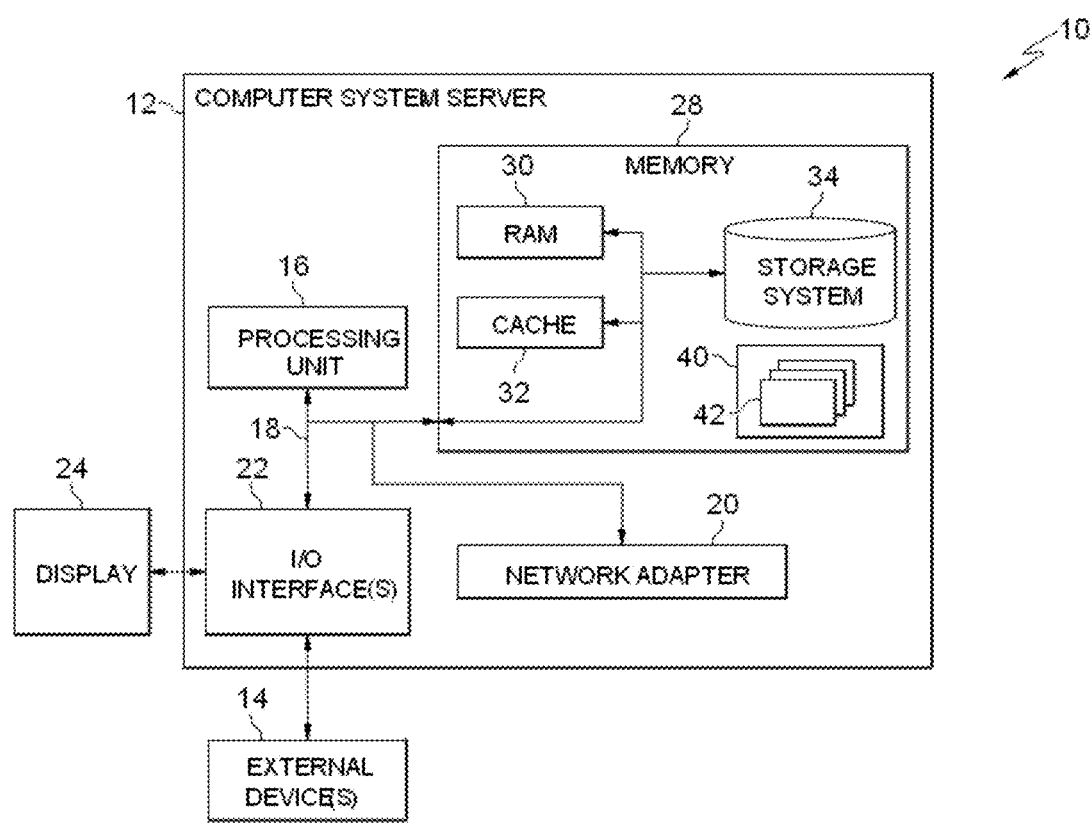
FIG. 1 shows an exemplary computer system which is applicable to implement the embodiments of the present invention.

A technical problem to be solved in this invention is to provide a method, apparatus and network server for enriching network contents, capable of reinforcing a website with object specifications on other websites without importing repeated information, and thus improving webpage aggregation efficiency.

According to an aspect of this invention, a method for enriching contents of a web site is provided, comprising: obtaining a corpus from the current website and other websites, and extracting object features from the corpus, wherein the corpus comprises specifications of the object and user reviews about the object; according to the corpus, constructing multi-dimensional vectors for the extracted features; for a specific feature, making similarity comparison of its multi-dimensional vectors and multi-dimensional vectors of other extracted features; determining features with similarities being higher than a predetermined threshold as a same feature, and reinforcing the current website with at least one feature which is different from those on the website and corresponding attributes of the at least one feature.

Optionally, obtaining a corpus from the website and other websites comprises: specifying the other websites; parsing layouts of the current website and the other websites; according to the parsed layouts of the current website and the other websites, finding out all blocks containing an object ID corresponding to the object; according to the block layouts, determining whether a block that has been found is a specification about the object or a user review about the object, and using specifications about the object and user reviews about the object that have been found as the corpus.

Optionally, extracting the object features from the corpus comprises: extracting at least one feature seed from the specifications about the object on the current website and other websites, wherein the at least one feature seed is extracted from corresponding fields according to the layouts of the specifications about the object of the current website and other websites; based on the extracted feature seed, extracting additional features from the user reviews about the object.

Optionally, extracting the additional features from the user reviews about the object comprises: extracting nouns satisfying predetermined conditions around the feature seed from the user reviews about the object as the additional feature; extracting noun phrases containing the feature seed from the user reviews about the object as the additional feature; if an extracted additional feature is not in a feature seed list, adding the extracted additional feature into the feature seed list; repeating the above operations iteratively until the number of additional features that are newly extracted and not in the feature seed list is less than a predetermined threshold.

Optionally, nouns satisfying predetermined conditions refer to top n nouns with the highest occurrence frequencies in a predetermined vicinity of a feature seed, wherein n is a natural number.

Optionally, the constructed multi-dimensional vector comprises at least one or more of the following dimensions: sentimental clue, including pairs of opinion words and sentimental words of a specific feature extracted from the user reviews of the object, or pairs of opinion category labels and sentimental words of the specific feature, wherein opinion words with analogous meaning are assigned with a same opinion category label; context clue, including adjectives and/or nouns and/or noun phases and/or negation words satisfying predetermined conditions around a specific feature in the user reviews of the object; available tag, including grouping tag information assigned to a specific feature by the current website and other websites.

Optionally, the constructed multi-dimensional vector further comprises at least one of the following dimensions: feature name; internal clue, including at least one keyword and a least one component word of a specific feature, wherein both of the keyword and the component word make up dimensions of the multi-dimensional vector.

Optionally, for a specific feature, comparing the similarity of its multi-dimensional vectors and multi-dimensional vectors of other extracted features comprises: aligning dimensions of multi-dimensional vectors of all extracted features, wherein for a specific feature, dimensions of multi-dimensional vectors of other features are treated as dimensions of the specific feature, so that each feature has the same number of dimensions; calculating mutual information between the specific feature in the corpus and each dimension of its multi-dimensional vectors as a weight of each dimension; calculating similarities between multi-dimensional vectors of various features according to the weights.

Optionally, wherein calculating mutual information between a specific feature in the corpus and each dimension of its multi-dimensional vectors as a weight of each dimension comprises: for dimensions added by considering dimensions of multi-dimension vectors of other features as dimensions of the specific feature, setting their weights to 0, otherwise calculating mutual information between the specific feature and a specific dimension of the feature as a weight of the dimension according to the following equation:

$$\text{Weight}(f_j; p_f) = \log_2 \frac{P(f_j, p_f)}{P(f_j)P(p_f)}$$

wherein, $p_f$ represents a specific feature, $f_1$ represents the j-th dimension of the specific feature, $P(f_j, p_f)$ is the probability of the concurrent occurrence in the corpus of the specific feature and the j-th dimension in a sentence, $P(f_j)$ is the occurrence probability in the corpus of the j-th dimension in a sentence, and $P(p_j)$ is the occurrence probability in the corpus of the specific feature in a sentence.

Optionally, similarities between multi-dimensional vectors of various features are calculated by the Euclidean distance.

$$\text{dis} \tan ce(v_i, v_j) = \sqrt{\sum_{k=1}^{k=n}(w(f_k(v_i)) - w(f_k(v_j)))^2}$$

Wherein, $v_i$ represents the multi-dimensional vector of the i-th feature, $v_j$ represents the multi-dimensional vector of the j-th feature;

$w(f_k(v_i))$ represents the weight of the k-th dimension of the multi-dimensional vector $v_i$, $w(f_k(v))$ represents the weight of the k-th dimension of the multi-dimensional vector $v_j$.

Optionally, similarities between multi-dimensional vectors of various features are calculated as cosine similarities.

$$\sin(v_i, v_j) = \cos\theta = \frac{\sum_{k=1}^{k=n} w(f_k(v_i)) \times w(f_k(v_j))}{\sqrt{\left(\sum_{k=1}^{k=n} w^2(f_k(v_i))\right)\left(\sum_{k=1}^{k=n} w^2(f_k(v_j))\right)}}$$

Wherein, $v_i$ represents the multi-dimensional vector of the i-th feature, $v_j$ represents the multi-dimensional vector of the j-th feature;

$w(f_k(v_i))$ represents the weight of the k-th dimension of the multi-dimensional vector $v_i$, $w(f_k(v_j))$ represents the weight of the k-th dimension of the multi-dimensional vector $v_j$.

Optionally, determining features with similarities being higher than a predetermined threshold as a same feature, and reinforcing the current website with a least one feature which is different from those on the website and corresponding attributes of the feature comprises: dividing the features with similarities being higher than the predetermined threshold into a same group; determining whether an feature of the object existing on the current website belongs to one of the groups, recognizing the feature groups that do not contain any feature of the object existing on the current website, and reinforcing the current website with the features in the feature group and the features' corresponding attributes.

Optionally, reinforcing the current website with features in the feature groups and the features' corresponding attributes comprises: counting occurrence times in the corpus of various features in a feature group, and reinforcing the current website with the name of feature with highest occurrence times and its corresponding attributes.

According to one aspect of this invention, an apparatus for enriching contents of a website is provided, comprising: an extracting unit configured to obtain a corpus from the current website and other websites, and extracting object features from the corpus, wherein the corpus comprises specifications of the object and user reviews about the object; a feature vector constructing unit configured to construct multi-dimensional vectors for the extracted features according to the corpus; a vector comparison unit configured to, for a specific feature, make similarity comparison of its multi-dimensional vector and multi-dimensional vectors of other extracted features; a reinforcing unit configured to determine features with similarities being higher than a predetermined threshold as a same feature, and reinforcing the current web site with at least one feature which is different from those on the website and corresponding attributes of the at least one feature.

Optionally, the extracting unit is further configured to: specify the other websites; parse layouts of the current website and the other websites; according to the parsed layouts of the current website and the other websites, find out all blocks containing an object ID corresponding to the object; according to the block layouts, determine whether a block that has been found is a specification about the object or a user review about the object, and use specifications about the object and user reviews about the object as the corpus.

Optionally, the extracting unit is further configured to: extract at least one feature seed from the specifications about the object on the current website and other websites, wherein the at least one feature seed is extracted from corresponding fields according to the layouts of the specifications about the object of the current website and other websites; based on the extracted feature seed, extract additional features from the user reviews about the object.

Optionally, extracting additional features from the user reviews about the object comprises: extracting nouns satisfying predetermined conditions around the feature seed from the user reviews about the object as the additional feature; extracting noun phrases containing the feature seed from the user reviews about the object as the additional feature; if an extracted additional feature is not in a feature seed list, adding the extracted additional feature into the feature seed list; the above operations iteratively until the number of additional features that are newly extracted and not in the feature seed list is less than a predetermined threshold.

Optionally, nouns satisfying predetermined conditions refer to top n nouns with the highest occurrence frequencies in a predetermine vicinity of a feature seed, wherein n is a natural number.

Optionally, the constructed multi-dimensional vector comprises at least one or more of the following dimensions: sentimental clue of feature, including pairs of opinion words and sentimental words of a specific feature extracted from user reviews of the object, or pairs of opinion category labels and sentimental words of a specific feature, wherein opinion words with an analogous meaning are assigned with a same opinion category label; context clue, including adjectives and/or nouns and/or noun phrases and/or negation words satisfying predetermined conditions around a specific feature in the user reviews of the object; available tag, including grouping tag information assigned to a specific feature by the current website and other websites.

Optionally, the constructed multi-dimensional vector further comprises at least one of the following dimensions: feature name; internal clue, including at least one keyword and a least one component word of a specific feature, wherein both of the keyword and the component word constitute dimensions of the multi-dimensional vector.

Optionally, the vector comparison unit is further configured to: align dimensions of multi-dimensional vectors of all extracted features, wherein for a specific feature, dimensions of multi-dimensional vectors of other features are treated as dimensions of the specific feature, so that each feature has the same number of dimensions; calculate mutual information between the specific feature in the corpus and each dimension of its multi-dimensional vectors as a weight of each dimension; calculate similarities between multi-dimensional vectors of various features according to the weights.

Optionally, calculating mutual information between a specific feature in the corpus and each dimension of its multi-dimensional vectors as a weight of each dimension comprises: for dimensions added by considering dimensions of multi-dimension vectors of other features as dimensions of the specific feature, setting their weights to 0, otherwise calculating mutual information between the specific feature and a specific dimension of the feature as a weight of the dimension according to the following equation.

$$\text{Weight}(f_j; p_f) = \log_2 \frac{P(f_j, p_f)}{P(f_j)P(p_f)}$$

wherein, $p_f$ represents a specific feature, $f_j$ represents the j-th dimension of the specific feature, $P(f_j, p_f)$ is the probability of the concurrent occurrence in the corpus of the specific feature and the j-th dimension in a sentence, $P(f_j)$ is the occurrence probability in the corpus of the j-th dimension in a sentence, and $P(p_j)$ is the occurrence probability in the corpus of the specific feature in a sentence.

Optionally, similarities between multi-dimensional vectors of various features are calculated by the Euclidean distance.

$$\operatorname{dis tan } ce(v_i, v_j) = \sqrt{\Sigma_{k=1}^{k=n}(w(f_k(v_i)) - w(f_k(v_j)))^2}$$

Wherein, $v_i$ represents the multi-dimensional vector of the i-th feature, $v_j$ represents the multi-dimensional vector of the j-th feature;

$w(f_k(v_i))$ represents the weight of the k-th dimension of the multi-dimensional vector $v_i$, $w(f_k(v_j))$ represents the weight of the k-th dimension of the multi-dimensional vector $v_j$.

Optionally, similarities between multi-dimensional vectors of various features are calculated as cosine similarities.

$$\sin(v_i, v_j) = \cos\theta = \frac{\sum_{k=1}^{k=n} w(f_k(v_i)) \times w(f_k(v_j))}{\sqrt{\left(\sum_{k=1}^{k=n} w^2(f_k(v_i))\right)\left(\sum_{k=1}^{k=n} w^2(f_k(v_j))\right)}}$$

Wherein, $v_i$ represents the multi-dimensional vector of the i-th feature, $v_j$ represents the multi-dimensional vector of the j-th feature;

$w(f_k(v_i))$ represents the weight of the k-th dimension of the multi-dimensional vector $v_i$, $w(f_k(v_j))$ represents the weight of the k-th dimension of the multi-dimensional vector $v_j$.

Optionally, the reinforcing unit is further configured to: divide the features with similarities being higher than the predetermined threshold into a same group; determine whether an feature of the object existing on the current website belongs to one of the groups, recognizing the feature groups that do not contain any feature of the object existing on the current website, and reinforcing the current website with features in the feature groups and the features' corresponding attributes.

Optionally, reinforcing the current website with the features of the groups and the features' corresponding attributes comprises: counting occurrence times in the corpus of various features in a feature group, and reinforcing the current website with the name of feature with highest occurrence times and its corresponding attributes.

According to an aspect of this invention, a network server comprising the apparatus for enriching contents of a website described above is provided.

A beneficial technical effect produced by this invention is to enrich the specification of an object on a website with specifications of the object on other websites without importing repeated information, and thus improving webpage aggregation efficiency.

Also, a beneficial technical effect of improving webpage information utilization in webpage aggregation is achieved in this invention.

Some exemplary embodiments will be described in more detail with reference to the accompanying drawings. However, the present disclosure may be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for an exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of layouts, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
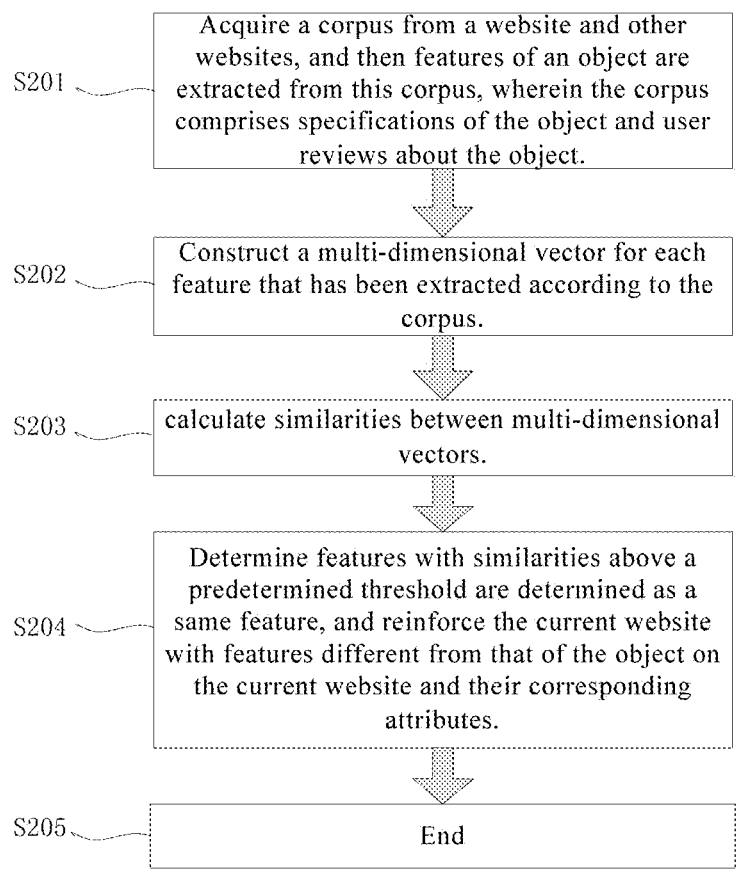
FIG. 2 schematically shows a flowchart of a method according to an embodiment of this invention.

Hereinafter, details of embodiment of this disclosure will be described with reference to drawings. As shown in FIG. 2, the method of this disclosure starts at operation S201. The embodiment is described with reference to a cell phone. At S201, a corpus is collected from a website and other websites, and then features of an object are extracted from this corpus. The corpus comprises specifications of the object and user reviews about the object. Specifications about the object may comprise network, memory, display and other parameters, as shown in FIG. 4. User reviews about the object may comprise text segments posted by users (not shown in FIG. 4), for example, "This mobile phone draws attention to its hardware configuration, especially its camera, and an attractive part indeed.", or "I enjoy this mobile phone for its large screen and sufficient memory capacity." As described in detail below, the corpus is a repository which may be used to determine whether features of an object are analogous ones.

Optionally, acquiring a corpus from the website and other websites comprises: specifying the other websites, which may be performed manually, or through searching a database storing information of potential websites to which various object may correspond; parsing layouts of the website and other websites; according to parsed layouts of the website and other websites, finding out all blocks containing an object ID corresponding to the object, which may be realized through, for example, well known crawling techniques. The object ID is at least one of a product name, model, image data; extracting contents from the blocks that have been found as the corpus, wherein contents of blocks in layouts corresponding to specifications of the object are extracted as specifications of the object, and contents of blocks in layouts corresponding to user reviews of the object are extracted as reviews of the object.

Figure 3:
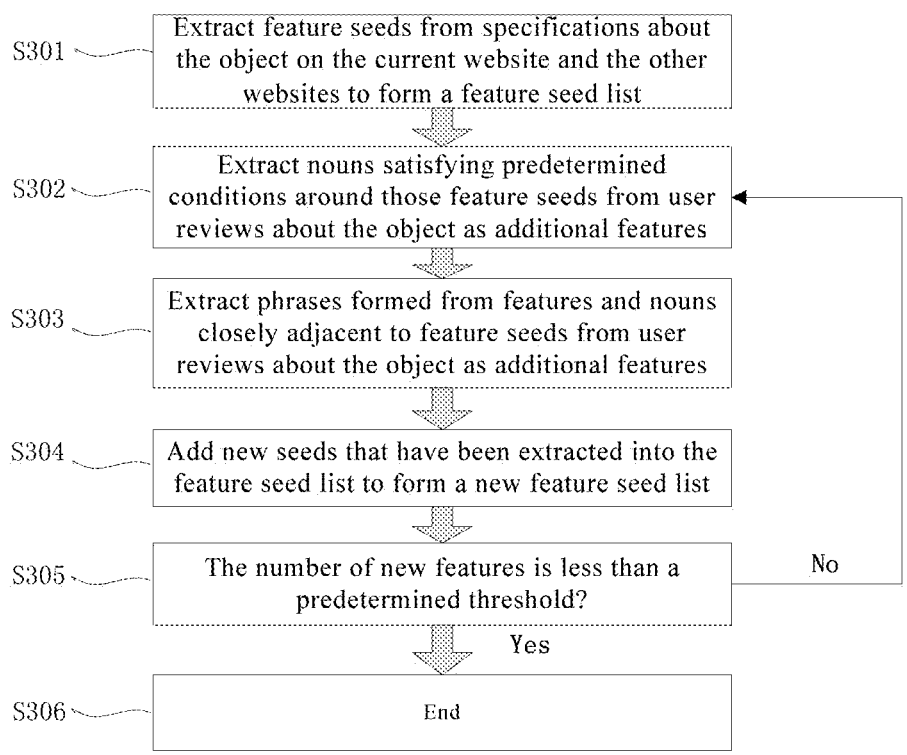
FIG. 3 schematically shows a flowchart of a process of extracting features according to an embodiment of this invention.

In an embodiment, after the acquisition of the corpus, features of the object are extracted, including as shown in FIG. 4, network technology, storage capacity, display technology, etc. Details of feature extraction will be described with reference to FIG. 3. First, at operation S301, feature seeds are extracted from specifications about the object on this website and the other websites. Feature seeds are features in predetermined fields of webpage layouts of those websites. Therefore, according to layouts of specifications of the object on this website and the other websites, feature seeds are extracted from predetermined fields. As shown in FIG. 4, all the features in the left field on the webpage of FIG. 4 (such as storage capacity, color, network generation . . . release data) are extracted as feature seeds. Then, at operations S302-S305, according to extracted feature seeds, additional features are extracted from user reviews about the object. First, at operation S302, nouns satisfying predetermined conditions around those feature seeds are extracted from user reviews about the object as additional features. For example, top n nouns with the highest occurrence frequencies around the feature seeds (for example, in a complete sentence with a feature seed or in a surrounding segment with a constant length) are extracted from all user reviews about the object as additional seeds (n is a natural number). How to locate the initial position of a complete sentence in which a feature seed locates or the initial position of a surrounding segment with a constant length, and how to recognize nouns in a specified area are well studied techniques, for example, part-of-speed tagging techniques (see http://en.wikipedia.org/wiki/Part-of-speech_tagging).

Next, at operation S303, with use of semantic analysis techniques which is well known by those skilled in the art, phrases formed by features and nouns closely adjacent to feature seeds are extracted from user reviews about the object as additional features. For example, if it has been found through semantic analysis that a feature "screen" appeared with an immediately adjacent noun "LCD" concurrently, the phrase "LCD screen" is extracted as an additional feature. Noun determination and part-of-speed are well known techniques in the prior art.

At operation S304, after the extraction of additional features, additional features extracted at S302 and S303 are compared with feature seeds in a current feature seed list. The comparison is the basis to add additional features that are not overlapped with those ones in the feature seed list into the feature seed list. At operation S305, it is determined that whether the number of additional features extracted at operation S302 and S303 is less than a threshold. If the number of additional features extracted at operation S302 and S303 is larger than or equal to the threshold, operations S302 to S304 repeat iteratively. If the number of additional features extracted at operation S302 and S303 is less than the threshold, the process of feature extraction ends at operation S306.

The lower the threshold value is, the more additional features that may be extracted from the corpus, and thus more comprehensive supplementation that may be achieved, however, with the more amount of computation. The higher the threshold value is, the less additional features that may be extracted from the corpus, and thus the less data for ultimate supplementation, however, with the less amount of computation.

Return to FIG. 2, after obtaining the corpus and extracting object features, the method proceeds to operation S202, in which a multi-dimensional vector is constructed for each feature that has been extracted according to the corpus. In an embodiment, a multi-dimensional vector may be represented as follows.

$$v(\text{feature})=(f_1,w_1;f_2,w_2;\ldots f_n,w_n) \quad (1)$$

Wherein, v(features) represents a multi-dimensional vector of a feature, $f_1$-$f_n$ represent n dimensions of the feature, $w_1$-$w_n$ represent corresponding weights of the n dimensions.

In an embodiment, the constructed multi-dimensional vector comprises at least one or more of the following items: sentimental clue of feature, context clue of the feature, and available label of feature. The constructed multi-dimensional vector may optionally comprise at least one of the following items: feature name, internal clue.

In an embodiment, mutual information of a feature and each dimension of the multi-dimensional vector of the feature is used as the weight of each dimension, wherein mutual information may be calculated with the following equation.

$$\text{Weight}(f_j; p_f) = log_2 \frac{P(f_j, p_f)}{P(f_j)P(p_f)} \quad (2)$$

wherein, $p_f$ represents a specific feature.

$f_j$ represents the j-th dimension of the specific feature.

$P(f_j, p_f)$ is the probability of the concurrent occurrence in the corpus of the specific feature and the j-th dimension in one sentence. The corpus herein refers to the corpus collected at operation S201. For example, if there are 1000 sentences in the corpus, and a feature "screen" and its dimension "large" appear in three seneses concurrently, the probability is 0.3%.

$P(f_j)$ is the occurrence probability in the corpus of the j-th dimension in a sentence, for example, if there are 1000 sentences in the corpus, and a dimension "large" appears in 30 sentences, the probability is 3%.

$P(p_f)$ is the occurrence probability in the corpus of the specific feature in a sentence. For example, if there are 1000 sentences in the corpus, and 100 sentences have a feature "screen" appeared therein, the probability is 10%.

For clarity, taking "LCD screen" as a feature of the object, how to construct a multi-dimensional vector v(LCD screen) will be illustrated below.

1) Feature Name

Taking a feature "LCD screen" as an example, the feature name of this feature is LCD screen.

2) Internal Clue

Internal clues of a feature comprise a feature headword and component words of the feature, wherein both the keyword and the component words construct dimensions of the multi-dimensional vector. Still with "LCD screen" as an example, by means of NLP techniques well known by those skilled in the art, such as phrase parsing techniques, "screen" may be recognized as the headword of the feature, and "LCD" is a component word of the feature.

3) Sentimental Clue of Feature

According to an embodiment, a sentimental clue is used for each feature to improve the accuracy of semantic recognition. Particularly, a sentimental clue of a feature comprises an opinion word and a sentiment word extracted from user reviews of the object. The opinion word and the sentiment word together form one dimension of the vector.

Using semantic analysis tools, a user review about the LCD screen of one mobile phone may be as follows:

"My new iPad is very good because its LCD screen is very large and clear."

Generally, with a semantic analysis tool, an attributive before "LCD screen" and a followed predicative may be found, that is, opinion words "very large", "clear" related to the feature "LCD screen" may be acquired. For the technique related to opinion word extraction, a reference may be made to Ana-Maria Popescu and Oren Etzioni "Opinion Mining: Extracting Product Feature Assessments from Reviews," in Proceedings of Human language Technology Conference and Conference on Empirical methods in Natural Language Processing, 2005, 339-346, which is incorporated herein by reference in its entirety. Further, through semantic analysis, the sentiments of the opinion words "very large" and "clear" are determined, that is, in commendatory sense or derogatory sense. For example, it is determined that "clear" is commendatory in the review about the LCD screen, and thus is assigned with a sentiment polarity "positive". Also, "very large" is commendatory for screen size and is assigned with a sentiment polarity "positive", while is derogatory for mobile phone size, and thus is assigned with a sentiment polarity "negative".

Therefore, a dimension assembled by an opinion word "very large" and a sentiment polarity "positive" and another dimension of an opinion word "clear" and a sentiment polarity "positive" may be found.

In an embodiment, opinion category labeling may be further used to reduce the number of feature dimensions and lower the amount of computation. For example, in user reviews, when the screen is concerned, "clear" and "limpid" actually express the similar meaning. At that point, in semantic analysis, "clear" and "limpid" may be assigned with the same opinion category label. Thereby, in computation, commendatory "clear" and "limpid" may be treated as a single dimension. It may be seen that opinion category labeling can reduce the number of dimensions for a multi-dimensional vector and thus lower computing complexity. In such a case, a dimension of a multi-dimensional vector is formed by an opinion category label and a sentiment word.

The assignment of opinion category labels may be carried out through looking up a table. For example, a correspondence table of features, opinion words, and opinion category labels may be maintained, in which the same opinion category labels are assigned for synonyms. In use, a corresponding opinion category label may be searched based on a feature or an opinion word.

4) Context Clue

Context clues of a feature comprise adjectives and/or nouns and/or noun phrases and/or negation words around the feature which satisfy a predetermined condition, wherein each of the adjectives and/or nouns and/or noun phrases and/or negation words satisfying predetermined conditions may construct a dimension of the multi-dimensional vector, and the predetermined condition is, for example, within n words adjacent to the feature on the left or right.

Taking the following exemplary user review as an example, let n=3, that is, 3 adjectives and/or nouns and/or noun phrases and/or negation words adjacent to the feature satisfying a predetermined condition on the left or right side will be searched:

"My new iPad is very good because its LCD screen is very large and clear."

Having the feature "LCD screen" as a boundary, 3 adjectives, 3 nouns, 3 noun phrases and 3 negation words on the left or right side of "LCD screen" are extracted respectively. Referring to the above example, the following items may be obtained:

adjectives on the left of "LCD screen": "good", "new";
adjectives on the right of "LCD screen": "large", "clear";

nouns on the left of "LCD screen": "iPad";
nouns on the right of "LCD screen": NULL;
negation words on the left of "LCD screen": NULL;
negation words on the right of "LCD screen": NULL.

In this example, the numbers of the adjectives, nouns, and negation words on the left and right sides are all less than 3.

Thus, dimensions OL(good), OL(new), OR(large), OR(clear), NL(iPad) are inserted into the multi-dimensional vector of each feature as 5 dimensions.

5) Available Tag

Available tags of a feature comprise grouping tag information assigned to a feature by the website and other websites, which may be used to construct a dimension of the multi-dimensional vector. As shown in FIG. 4, features have been grouped on some websites, and each group has been assigned with a tag, such as "key features", "battery" as shown in FIG. 4. In such a case, a tag actually represents a common attribute of some features. Thus, in this disclosure, tags are used as a grouping foundation.

An issue may arise from the above process, that is, because there are different numbers of opinion word-sentiment word pairs in sentimental clues found for various features, and there are different numbers of adjectives and/or nouns and/or noun phrases and/or negation words in context clues found for various features, the final multi-dimensional vectors determined for various features may have different dimension numbers. In order to calculate feature vector similarity, first, various feature vectors must have consistent dimension numbers. In one solution, dimensions of multi-dimensional vectors of all extracted features are aligned with each other, wherein, for a particular feature, dimensions of multi-dimensional vectors of other features are also treated as dimensions of that feature, so that each feature has the same number of dimensions in its multi-dimensional vector. However, in mutual information computation, the weight of a dimension which is added for a particular feature as being one dimension of the multi-dimensional vector of another extracted feature is considered as zero.

For example, two features of the object are extracted from the corpus: "LCD screen", "display". For "LCD screen", the feature has a feature name "LCD screen", internal clues "screen" and "LCD", sentimental clues "very large, positive" and "clear, positive", context clues "OL (good)", "OL(new)", "OR(large)", "OR(clear)", and "NL(iPad)", an available tag "display".

For "display", the feature has a feature name "display", an internal clue "display", a sentimental clue "clear, positive", context clues "OL (flat)", "OL(new)", "OR(large)", "OR (clear)", and "NL(iPad)", an available tag "display".

Therefore, a multi-dimensional vector constructed for "LCD screen" has not only dimensions "LCD screen", "screen", "LCD", "very large, positive", "clear, positive", "OL (good)", "OL(new)", "OR(large)", "OR(clear)", "NL (iPad)", "display", but also "display" and "OL (flat)", while for "display" and "OL (flat)", in feature vector similarity computation, their weights are set to zero.

Below, similarity computation after multi-dimensional vector alignment will be described. As described above, after constructing multi-dimensional vectors for various features, the method proceeds to operation S203. After constructing multi-dimensional vectors for various features, similarity between two multi-dimensional vectors may be calculated in many ways. For example, similarity between two multi-dimensional vectors may be calculated according to Euclidean distance or cosine similarity.

The equation of Euclidean distance is as follows.

$$\operatorname{dis} \tan ce(v_i, v_j) = \sqrt{\sum_{k=1}^{k=n}(w(f_k(v_i)) - w(f_k(v_j)))^2} \quad (3)$$

The equation of cosine similarity is as follows.

$$\sin(v_i, v_j) = \cos\theta = \frac{\sum_{k=1}^{k=n} w(f_k(v_i)) \times w(f_k(v_j))}{\sqrt{\left(\sum_{k=1}^{k=n} w^2(f_k(v_i))\right)\left(\sum_{k=1}^{k=n} w^2(f_k(v_j))\right)}} \quad (4)$$

Wherein, $v_i$ represents the multi-dimensional vector of the i-th feature, $v_j$ represents the multi-dimensional vector of the j-th feature; $w(f_k(v_i))$ represents the weight of the k-th dimension of the multi-dimensional vector $v_i$; similarly, $w(f_k(v_j))$ represents the weight of the k-th dimension of the multi-dimensional vector v Euclidean distance represents a distance between two data points, the smaller the distance is, the more similar data points it indicates; cosine similarity represents an angle between two vectors, the smaller the angle is (a value approximating to 1), the higher similarity the two vectors have.

As described above, because multi-dimensional vectors of various features have the same dimension number and sequence after dimension alignment, similarity between two feature vectors is calculated using weights of various dimensions of two features' multi-dimensional vectors. Note that the similarity is calculated on the basic of two of the multiple features.

At operation S204, features with similarities above a predetermined threshold are determined as a same feature, and the website is reinforced with features different from that of the existing objects on the website and their corresponding attributes. Particularly, features with similarities above the predetermined threshold are grouped together, and then it is determined whether features of the existing objects on the website belong to any one of those groups; the obtained feature groups which have no features of the existing objects on the website are recognized, and the features in such groups and their attributes are to be added to the website.

For example, if there are total n features. First, similarities between the multi-dimensional vector of a first feature and multi-dimensional vectors of other n−1 features are calculated to divide the features with similarities above a predetermined threshold into one group. For example, there are m features having similarities above the predetermined threshold. The m features are excluded from the subsequent comparison. For the remained (n−m) features, another first feature is retrieved to perform similarity comparison with other (n−m⁻¹) features of the (n−m) features.

In an embodiment, similarities between multi-dimensional vectors may be calculated through equations (3) and (4) to get similarities obtained comprehensively from the both computations.

Through grouping, for example, features "LCD screen", "LCD display" and "display screen" are divided into the same group, indicating that those features actually denote the same content.

At that point, a determination of which groups various features on the present website to be reinforced belong to is performed. Because features of the present website have been extracted when the corpus is constructed, those features have been necessarily subjected to the grouping process and contained in certain groups. Groups those features belong to may be easily located through searching. Feature groups having features on the present website contained therein are excluded from website content reinforcement. In other words, for new groups having no features of the object existed on the present website contained herein, features in those groups and their corresponding attributes are used to reinforce the present website.

In reinforcement, there may be some difference between feature names even in one group. For instance, a group may comprise features "LCD screen", "LCD display" and "display screen", which refer to a same thing. At that point, a statistic may be made to count in the corpus the occurrence times of the various features in this group, and then the website is reinforced with feature names having top occurrence times and their corresponding attributes.

For example, in the above feature group, if it has been found through statistics that "display" has the maximum occurrence frequency in the corpus. Therefore, the feature name "display" is used as the name of the feature when reinforcing present website.

On another aspect, when determining the name of a supplemented feature, a search is performed for which website the feature came from to acquire attributes of the feature from that website. More particularly, attributes may comprise attribute words and attribute values. For example, as to "other use time" of FIG. 6, attribute words on a website are "music playing time", "video displaying time", "video recording time", "video calling time", and corresponding attribute values are "54 h", "6.5 h", "3.8 h", "2.6 h". Thus, the website is supplemented with a feature "other use time", as well as those attribute words and attribute values.

The method ends at operation S205.

Note that this disclosure is independent of the language kinds. Although this disclosure has been described in the case of Chinese, it may be realized on other languages, such as English. As described above, word extraction, opinion word analysis, etc., may be achieved using other languages.

Figure 5:
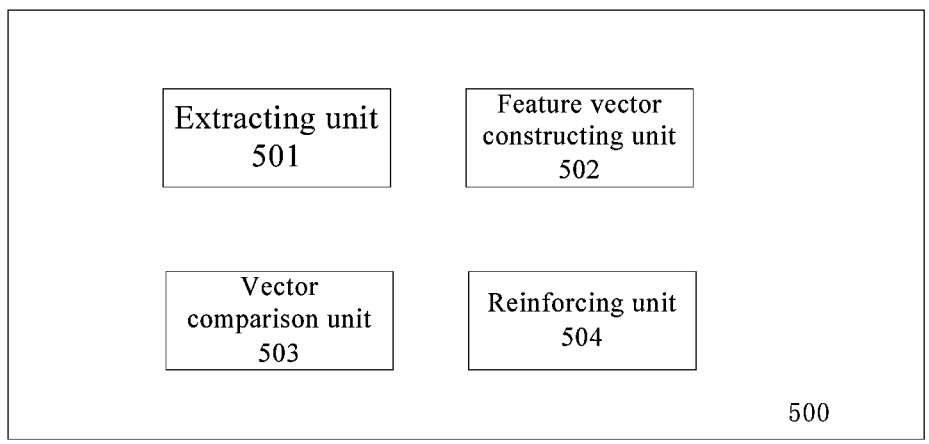
FIG. 5 schematically shows a block view of an apparatus according to an embodiment of this invention.

An apparatus for enriching contents of a website according to this disclosure will be described with reference to FIG. 5, comprising: an extracting unit 501 configured to obtain a corpus from this website and other websites, extract features of an object from the corpus, wherein the corpus comprises specifications of the object and user reviews about the object; a feature vector constructing unit 502 configured to according to the corpus, construct multi-dimensional vectors for the extracted features; a vector comparison unit 503 configured to, for a specified feature, make similarity comparison of its multi-dimensional vector and multi-dimensional vectors of other extracted features; a reinforcing unit 504 configured to determine features with similarities higher than a predetermined threshold as the same features, and reinforce the website with features different from that of the object on the website and their corresponding attributes.

Optionally, the extracting unit 501 is further configured to specify other websites; parse layouts of this website and the other websites; according to parsed layouts of this website and the other websites, find out all blocks containing an object ID corresponding to the object; according to block layouts, determine whether a block that has been found is a specification about the object or a user review about the object, and use the specification about the object and the user review about the object as the corpus.

Optionally, the extracting unit 501 is further configured to extract feature seeds from specifications about the object on this website and other websites, wherein the feature seeds are extracted from corresponding fields according to layouts of the specifications about the object of this web site and other websites; according to extracted feature seeds, extract additional features from user reviews about the object.

Optionally, extracting additional features from user reviews about the object comprises: extracting nouns satisfying predetermined conditions around the feature seeds from user reviews about the object as the addition features; extracting noun phrases containing the feature seeds from user reviews about the object as the addition features; if an extracted additional feature is not in a feature seed list, adding the extracted additional feature into the feature seed list; repeating the above operations iteratively until the number of additional features newly extracted that are not in the feature seed list is less than a predetermined threshold.

Optionally, nouns satisfying predetermined conditions refer to top n nouns with the highest occurrence frequencies in a predetermine vicinity of a feature seed, wherein n is a natural number.

Optionally, the constructed multi-dimensional vector comprises at least one or more of the following dimensions: sentimental clue of feature, including pairs of opinion words and sentimental words of a specific feature extracted from user reviews of the object, or pairs of opinion category labels and sentimental words of a specific feature, wherein opinion words with an analogous meaning are assigned with the same opinion category label; context clue, i.e., adjectives and/or nouns and/or noun phases and/or negation words satisfying predetermined conditions around a specific feature in user reviews of the object; available tag, i.e., grouping tag information assigned to a specific feature by the website and other websites.

Optionally, the constructed multi-dimensional vector further comprises at least one of the following dimensions: feature name; internal clue, including keywords of a specific feature and component words of a specific feature, wherein the keywords and the component words constitute dimensions of the multi-dimensional vector.

Optionally, the vector comparison unit is further configured to align dimensions of multi-dimensional vectors of all extracted features, wherein for a specific feature, dimensions of multi-dimensional vectors of other features are treated as dimensions of the specific feature, so that each feature has the same number of dimensions in its multi-dimensional vector; calculate mutual information between a specific feature in the corpus and each dimension of its multi-dimensional vector as a weight of each dimension; calculate similarities between multi-dimensional vectors of various features according to the weights.

Optionally, calculating mutual information between a specific feature in the corpus and each dimension of its multi-dimensional vector as a weight of each dimension comprises:

for dimensions added by considering dimensions of multi-dimension vectors of other extracted features as dimensions of the specific feature, setting their weights to 0, otherwise calculating mutual information between the specific feature and a specific dimension as a weight of the dimension according to the following equation.

$$\text{Weight}(f_j; p_f) = \log_2 \frac{P(f_j, p_f)}{P(f_j)P(p_f)}$$

$p_f$ represents a specific feature, $f_j$ represents the j-th dimension of the specific feature, $P(f_j, p_f)$ is the probability of the concurrent occurrence in the corpus of the specific feature and the j-th dimension in a sentence, P($f_j$) is the occurrence probability in the corpus of the j-th dimension in a sentence, and P($p_j$) is the occurrence probability in the corpus of the specific feature in a sentence.

Optionally, similarities between multi-dimensional vectors of various features may be calculated by the Euclidean distance.

$$\operatorname{dis tan} ce(v_i, v_j) = \sqrt{\Sigma_{k=1}^{k=n}(w(f_k(v_i))-w(f_k(v_j)))^2}$$

Wherein, $v_i$ represents a multi-dimensional vector of the i-th feature, $v_j$ represents a multi-dimensional vector of the j-th feature;

$w(f_k(v_i))$ represents the weight of the k-th dimension of the multi-dimensional vector $v_i$, $w(f_k(v_j))$ represents the weight of the k-th dimension of the multi-dimensional vector $v_j$.

Optionally, similarities between multi-dimensional vectors of various features may be calculated as cosine similarities.

$$\sin(v_i, v_j) = \cos\theta = \frac{\sum_{k=1}^{k=n} w(f_k(v_i)) \times w(f_k(v_j))}{\sqrt{\left(\sum_{k=1}^{k=n} w^2(f_k(v_i))\right)\left(\sum_{k=1}^{k=n} w^2(f_k(v_j))\right)}}$$

Wherein, $v_i$ represents a multi-dimensional vector of the i-th feature, $v_j$ represents a multi-dimensional vector of the j-th feature;

$w(f_k(v_i))$ represents the weight of the k-th dimension of the multi-dimensional vector $v_i$, $w(f_k(v_j))$ represents the weight of the k-th dimension of the multi-dimensional vector $v_j$.

Optionally, the reinforcing unit is further configured to divide features with similarities higher than the predetermined threshold into one group; determine whether an feature of the object exited on the web site belongs to a group; recognize feature groups having no features of the object existed on the web site contained therein, and reinforce the website with features of those feature groups and their corresponding attributes.

Optionally, reinforcing the website with features of those groups and their corresponding attributes comprises: counting occurrence times in the corpus of various features in a feature group, and reinforcing the website with the names of features with highest occurrence times and their corresponding attributes.

Note that, due to the exchangeability of computer software and hardware, for example, a piece of software code may be converted to corresponding hardware through a hardware description language (e.g. Verilog, etc.), for example, FPGA (Field Programmable Gate Array) or a specialized chip. Hence, embodiments of this disclosure may be realized in software, hardware, or firmware. This disclosure has sufficiently disclosed components of the apparatus capable of achieving the purpose of this disclosure, and connection relationships between various components through signal transmission. Therefore, those skilled in the art may fully understand that techniques disclosed herein may be realized in hardware or firmware. In addition, for simplicity, only those operations, modules closely related to this disclosure have been described herein, while other components are omitted. However, those skilled in the art may understand that the method and apparatus of this disclosure may comprise other operations and modules in additions to those described above.

FIG. 6 shows effects of embodiments according to this disclosure. It may be seen that several absent features of the present website have been listed after supplementation, and may practical features extracted from other websites have been supplemented, so that users may be aware of complete information without searching on other websites.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for enriching contents of a current website, the apparatus comprising a memory and a processor, the processor configured to:

obtain a corpus from the current website and other websites, and extracting object features from the corpus, wherein the corpus comprises specifications of the object and user reviews about the object;

construct multi-dimensional vectors for the extracted features according to the corpus;

for a specific feature, make similarity comparison of its multi-dimensional vector and multi-dimensional vectors of other extracted features, wherein the similarity comparison comprises:

calculation of mutual information between the specific feature in the corpus and each dimension of its multi-dimensional vector as a weight of each dimension; and calculation of similarities between the multi-dimensional vector of the specific feature in the corpus and the multi-dimensional vectors of the extracted features according to the weights of each dimension, and wherein, the similarities between the multi-dimensional vectors of are calculated based on Euclidean distance; and determine features with similarities being higher than a predetermined threshold as a same feature, and reinforcing the current website with at least one feature which is different from those on the website and corresponding attributes of the at least one feature.

2. The apparatus according to claim 1, wherein the processor is further configured to:
specify the other websites;
parse layouts of the current website and the other websites;
according to the parsed layouts of the current website and the other websites, find out all blocks containing an object ID corresponding to the object; and
according to the block layouts, determine whether a block that has been found is a specification about the object or a user review about the object, and use specifications about the object and user reviews about the object as the corpus.

3. The apparatus according to claim 1, wherein the processor is further configured to:
extract at least one feature seed from the specifications about the object on the current website and other websites, wherein the at least one feature seed is extracted from corresponding fields according to the layouts of the specifications about the object of the current web site and other websites; and
based on the extracted feature seed, extract additional features from the user reviews about the object.

4. The apparatus according to claim 3, wherein extracting additional features from the user reviews about the object comprises:
extracting nouns satisfying predetermined conditions around the feature seed from the user reviews about the object as the additional feature;
extracting noun phrases containing the feature seed from the user reviews about the object as the additional feature;
if an extracted additional feature is not in a feature seed list, adding the extracted additional feature into the feature seed list; and
iterating until a number of additional features that are newly extracted and not in the feature seed list is less than a predetermined threshold.

5. The apparatus according to claim 4, wherein nouns satisfying predetermined conditions refer to top n nouns with the highest occurrence frequencies in a predetermined vicinity of a feature seed, wherein n is a natural number.

6. The apparatus according to claim 1, wherein the constructed multi-dimensional vector comprises at least one or more of the following dimensions:
sentimental clue of feature, including pairs of opinion words and sentimental words of a specific feature extracted from user reviews of the object, or pairs of opinion category labels and sentimental words of a specific feature, wherein opinion words with an analogous meaning are assigned with a same opinion category label;
context clue, including adjectives and/or nouns and/or noun phrases and/or negation words satisfying predetermined conditions around a specific feature in the user reviews of the object; and
available tag, including grouping tag information assigned to a specific feature by the current website and other websites.

7. The apparatus according to claim 6, wherein the constructed multi-dimensional vector further comprises at least one of the following dimensions:
feature name; and
internal clue, including at least one keyword and a least one component word of a specific feature, wherein both of the keyword and the component word constitute dimensions of the multi-dimensional vector.

8. The apparatus according to claim 1, wherein the processor is further configured to:
align dimensions of multi-dimensional vectors of all extracted features, wherein for the specific feature, dimensions of the multi-dimensional vectors of the other extracted features are treated as dimensions of the specific feature, so that each feature has the same number of dimensions.

9. The apparatus according to claim 8, wherein calculating mutual information between a specific feature in the corpus and each dimension of its multi-dimensional vectors as a weight of each dimension comprises:
for dimensions added by considering dimensions of multi-dimension vectors of other features as dimensions of the specific feature, setting their weights to 0, otherwise calculating mutual information between the specific feature and a specific dimension of the feature as a weight of the dimension according to the following equation:

$$\text{Weight}(f_j; p_f) = \log 2 \frac{P(f_j, p_f)}{P(f_j)P(p_f)}$$

wherein,
$p_f$ represents a specific feature,
$f_j$ represents a j-th dimension of the specific feature,
$P(f_j, p_f)$ is a probability of a concurrent occurrence in the corpus of the specific feature and the j-th dimension in a sentence,
$P(f_j)$ is an occurrence probability in the corpus of the j-th dimension in a sentence, and
$P(p_j)$ is an occurrence probability in the corpus of the specific feature in a sentence.

10. The apparatus according to claim 8, wherein the Euclidean distance is calculated based on:

$$\text{dis}\tan ce(v_i, v_j) = \sqrt{\Sigma_{k=1}^{k=n}(w(f_k(v_i)) - w(f_k(v_j)))^2}$$

wherein,
$v_i$ represents a multi-dimensional vector of an i-th feature,
$v_j$ represents a multi-dimensional vector of a j-th feature;
$w(f_k(v_i))$ represents the weight of a k-th dimension of the multi-dimensional vector $v_i$, and
$w(f_k(v_j))$ represents the weight of a k-th dimension of the multi-dimensional vector $v_j$.

11. The apparatus according to claim 1, wherein the processor is further configured to:
divide the features with similarities being higher than the predetermined threshold into a same group; and
determine whether an feature of the object existing on the current website belongs to one of the groups, recognizing the feature groups that do not contain any feature of the object existing on the current website, and reinforcing the current website with features in the feature groups and the features' corresponding attributes.

12. The apparatus according to claim 11, wherein reinforcing the current website with the features of the groups and the features' corresponding attributes comprises counting occurrence times in the corpus of various features in a feature group, and reinforcing the current website with a name of a feature with highest occurrence times and its corresponding attributes.

13. A network server, comprising an apparatus for enriching contents of a current website, wherein the apparatus comprises a processor configured to execute computer executable units, the computer executable units comprising:

an extracting unit configured to obtain a corpus from the current website and other websites, and extracting object features from the corpus, wherein the corpus comprises specifications of the object and user reviews about the object;

a feature vector constructing unit configured to construct multi-dimensional vectors for the extracted features according to the corpus;

a vector comparison unit configured to, for a specific feature, make similarity comparison of its multi-dimensional vector and multi-dimensional vectors of other extracted features, wherein the similarity comparison comprises:

calculation of mutual information between the specific feature in the corpus and each dimension of its multi-dimensional vector as a weight of each dimension; and calculation of similarities between the multi-dimensional vector of the specific feature in the corpus and the multi-dimensional vectors of the extracted features according to the weights of each dimension, and wherein, the similarities between the multi-dimensional vectors of are calculated based on Euclidean distance; and a reinforcing unit configured to determine features with similarities being higher than a predetermined threshold as a same feature, and reinforcing the current website with at least one feature which is different from those on the website and corresponding attributes of the at least one feature.

14. The network server according to claim 13, wherein the Euclidean distance is calculated based on:

$$\mathrm{distance}(v_i, v_j) = \sqrt{\sum_{k=1}^{k=n}(w(f_k(v_i))-w(f_k(v_j)))^2}$$

wherein, $v_i$ represents a multi-dimensional vector of an i-th feature, $v_j$ represents a multi-dimensional vector of a j-th feature;

$w(f_k(v_i))$ represents the weight of a k-th dimension of the multi-dimensional vector $v_i$, and $w(f_k(v_j))$ represents the weight of a k-th dimension of the multi-dimensional vector $v_j$.

15. An apparatus for enriching contents of a current website, comprising a processor configured to execute one or more computer executable units, the computer executable units comprising:

an extracting unit configured to obtain a corpus from the current website and other websites, and extracting object features from the corpus, wherein the corpus comprises specifications of the object and user reviews about the object;

a feature vector constructing unit configured to construct multi-dimensional vectors for the extracted features according to the corpus;

a vector comparison unit configured to, for a specific feature, make similarity comparison of its multi-dimensional vector and multi-dimensional vectors of other extracted features, wherein the similarity comparison comprises:

calculation of mutual information between the specific feature in the corpus and each dimension of its multi-dimensional vector as a weight of each dimension; and calculation of similarities between the multi-dimensional vector of the specific feature in the corpus and the multi-dimensional vectors of the extracted features according to the weights of each dimension, and wherein, the similarities between the multi-dimensional vectors of are calculated based on cosine values between the dimensions; and a reinforcing unit configured to determine features with similarities being higher than a predetermined threshold as a same feature, and reinforcing the current website with at least one feature which is different from those on the website and corresponding attributes of the at least one feature.

16. The apparatus according to claim 15, wherein the cosine values are calculated as:

$$\sin(v_i, v_j) = \cos\theta = \frac{\sum_{k=1}^{k=n} w(f_k(v_i)) \times w(f_k(v_j))}{\sqrt{\left(\sum_{k=1}^{k=n} w^2(f_k(v_i))\right)\left(\sum_{k=1}^{k=n} w^2(f_k(v_j))\right)}}$$

wherein, $v_i$ represents a multi-dimensional vector of an i-th feature, $v_j$ represents a multi-dimensional vector of a j-th feature;

$w(f_k(v_i))$ represents the weight of a k-th dimension of the multi-dimensional vector $v_i$, and $w(f_k(v_j))$ represents the weight of a k-th dimension of the multi-dimensional vector $v_j$.

17. The apparatus according to claim 15, wherein the vector comparison unit is further configured to align dimensions of multi-dimensional vectors of all extracted features, wherein for the specific feature, dimensions of the multi-dimensional vectors of the other extracted features are treated as dimensions of the specific feature, so that each feature has the same number of dimensions.

18. A network server comprising an apparatus for enriching contents of a current website, the apparatus comprising a processor configured to execute one or more computer executable units, the computer executable units comprising:

an extracting unit configured to obtain a corpus from the current website and other websites, and extracting object features from the corpus, wherein the corpus comprises specifications of the object and user reviews about the object;

a feature vector constructing unit configured to construct multi-dimensional vectors for the extracted features according to the corpus;

a vector comparison unit configured to, for a specific feature, make similarity comparison of its multi-dimensional vector and multi-dimensional vectors of other extracted features, wherein the similarity comparison comprises:

calculation of mutual information between the specific feature in the corpus and each dimension of its multi-dimensional vector as a weight of each dimension; and calculation of similarities between the multi-dimensional vector of the specific feature in the corpus and the multi-dimensional vectors of the extracted features according to the weights of each dimension, and wherein, the similarities between the multi-dimensional vectors of are calculated based on cosine values between the dimensions; and a reinforcing unit configured to determine features with similarities being higher than a predetermined threshold as a same feature, and reinforcing the current website with at least one feature which is different from those on the website and corresponding attributes of the at least one feature.

19. The network server according to claim 18, wherein the cosine values are calculated as:

$$\sin(v_i, v_j) = \cos\theta = \frac{\sum_{k=1}^{k=n} w(f_k(v_i)) \times w(f_k(v_j))}{\sqrt{\left(\sum_{k=1}^{k=n} w^2(f_k(v_i))\right)\left(\sum_{k=1}^{k=n} w^2(f_k(v_j))\right)}}$$

wherein, $v_i$ represents a multi-dimensional vector of an i-th feature, $v_j$ represents a multi-dimensional vector of a k-th feature;

$w(f_k(v_i))$ represents the weight of a k-th dimension of the multi-dimensional vector $v_i$, and $w(f_k(v_j))$ represents the weight of a k-th dimension of the multi-dimensional vector $v_j$.

20. The network server according to claim 18, wherein the vector comparison unit is further configured to align dimensions of multi-dimensional vectors of all extracted features, wherein for the specific feature, dimensions of the multi-dimensional vectors of the other extracted features are treated as dimensions of the specific feature, so that each feature has the same number of dimensions.

* * * * *